United States Patent Office 3,551,187
Patented Dec. 29, 1970

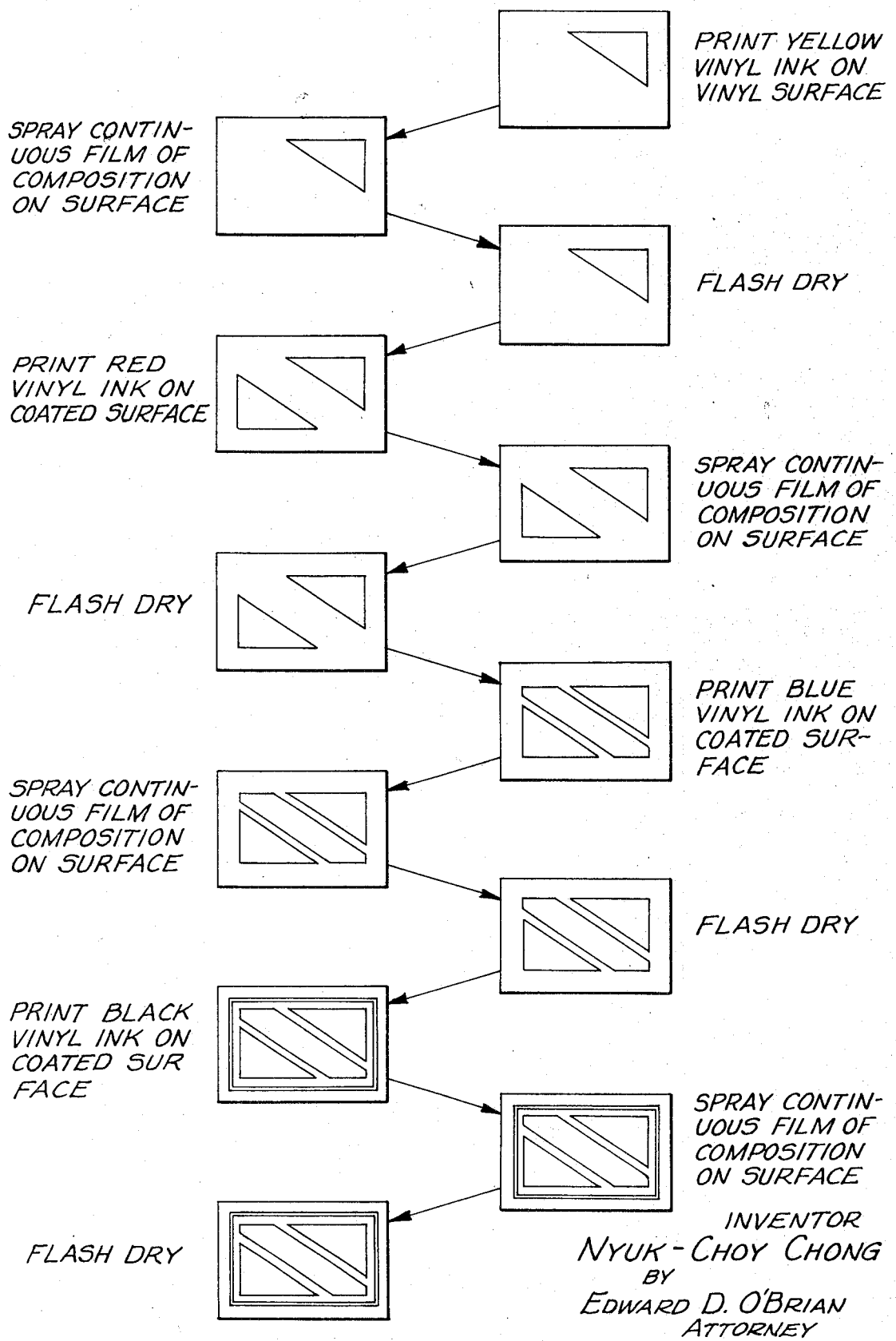

3,551,187
PROCESS FOR FIXING AN INK UPON A
VINYL POLYMER SURFACE
Nyuk-Choy Chong, P.O. Box 1243,
Redondo Beach, Calif. 90278
Filed Apr. 20, 1967, Ser. No. 632,260
Int. Cl. B44d 1/16; B44m 1/30
U.S. Cl. 117—76                                    5 Claims

ABSTRACT OF THE DISCLOSURE

A composition for use in "fixing" an ink impression or area upon a polymer surface in which the polymer is of a conventional "vinyl" type and is selected from the group consisting of vinyl chloride polymers, copolymers of vinyl chloride and vinyl acetate, and copolymers of vinyl chloride and vinylidene chloride. The composition comprises a solvent solution of at least one vinyl polymer selected from this group and at least one film-forming acrylic polymer dissolved in tetrahydrofuran. Other secondary ingredients such as a plasticizer and other solvents may be present in the composition. The composition preferably is used by applying it by spraying onto a dried or undried ink impression or area upon such a polymer surface, and then simultaneously drying the ink and the composition.

BACKGROUND OF THE INVENTION

The term "printing" is commonly used in a generic sense to designate any process in which an ink impression or area is located upon a surface by any one of a variety of methods such as letterpress, lithography, silk screen or the like. A great deal of work has been done in the printing field in order to provide procedures whereby clear, sharp images may be located upon a variety of different surfaces. In spite of this work, a significant problem has been encountered in printing upon so-called "vinyl" surfaces. There has been a problem in applying ink impressions or areas upon such surface in such a manner that the ink impressions or areas are distinct and clearly colored the color of the ink and are sufficiently permanent so that they cannot be rubbed off by normal abrasion.

Although the term "vinyl" is capable of technically designating a wide variety of different materials, and although there is a wide variety of different vinyl compounds, in industry this term is commonly usually used in a very restricted sense. As used in this specification, the term "vinyl," used to designate a polymer or polymer surface, is employed so as to designate vinyl chloride polymers, copolymers of vinyl chloride and vinyl acetate containing from 5 to 40% by weight vinyl acetate, copolymers of vinyl chloride and vinylidene chloride containing 5 to 20% by weight vinylidene chloride, and other closely related polymers. These polymers and copolymers normally contain various conventional amounts of secondary ingredients such as plasticizers. This restricted meaning of the term "vinyl" is in accordance with conventional trade or industry use of the term, as is shown by the "Textbook of Polymer Science" by Billmeyer, Interscience Publishers, copyright 1962, page 412.

The inks which have been used in printing upon such "vinyl" surfaces are commonly referred to as "vinyl" inks, inasmuch as they have been specially formulated for such use. In certain cases, many of these "vinyl" inks have other utility as in printing upon other materials. However, it has been recognized in the industry that specially adapted inks are normally required in order to provide even reasonably acceptable printing upon "vinyl" surfaces.

In spite of the development of such specialized inks, the aforenoted problems in providing satisfactory printing upon "vinyl" surfaces have remained, particularly with certain types of printing processes. The reasons as to why it has been difficult, if not effectively impossible, to provide clear, distinct, permanent ink impressions or areas upon such vinyl surfaces by certain printing processes have not been completely understood. It has been theorized that these difficulties have been connected with plasticizer migration from a "vinyl" surface into a "vinyl" ink, or in the reverse direction, from the ink into the surface, in part because of the mobility imparted to the molecules.

SUMMARY OF THE INVENTION

An object of this invention is to provide a composition to be used in conjunction with the printing of a so-called "vinyl" ink upon a "vinyl" surface so as to serve to fix or adhere the ink area or impression applied to such a surface so that this ink area or impression remains clear, distinct, and relatively permanent in the sense that it is resistant to physical abrasion. A further object of this invention is to provide a process for using such a composition in such a manner as to render such an ink area or impression clear, distinct and permanent.

From these objectives of this invention it will be apparent that the invention is intended to eliminate or minimize the problems of the prior art regarding obtaining printing upon "vinyl" surfaces which is clear, distinct and permanent. By virtue of the invention, it is possible to provide satisfactory multicolor printing upon even very flexible "vinyl" sheets. This is considered quite desirable from a commercial standpoint inasmuch as it is commonly desired to use flexible "vinyl" sheets for various items such as maps, wall paper and the like, because of the physical properties of such sheets and the fact that such sheets can be cleaned readily by washing so as to always have a "fresh" appearance.

As an aid to understanding the invention, it can be indicated that a composition falling within the scope of the invention must include or comprise a solvent solution of at least one vinyl polymer selected from the group consisting of vinyl chloride polymers, copolymers of vinyl chloride and vinyl acetate, and copolymers of vinyl chloride and vinylidene chloride, and at least one film-forming acrylic polymer dissolved in tetrahydrofuran serving as the solvent. The composition may contain other ingredients, as hereinafter indicated, such as at least one plasticizer and one or more other solvents, all of the ingredients forming one solution.

A composition of this type is preferably used by being applied to a "vinyl" surface immediately after a so-called "vinyl" ink is applied to such surface, before the ink has had a chance to dry to any significant extent or to diffuse into the structure of the vinyl surface or before the vinyl surface material has had a chance to diffuse into the ink to any visibly apparent extent. Then the composition and the ink are both dried as rapidly as conveniently possible. The composition can also be applied to a dry ink on a vinyl surface. This serves to "fix" the ink area or impression upon the surface in such a manner that this area is clear, distinct and relatively permanent in the sense that it cannot be removed readily from the surface. In accordance with this invention, various other successive printed areas of the same or different colors can be applied upon such a surface in the same manner.

DESCRIPTION OF THE DRAWING

The figure of the accompanying drawing is intended to show in a diagrammatic manner the various steps followed in accordance with the method of this invention in printing a composite, multi-colored image upon a "vinyl" sheet.

DESCRIPTION OF THE INVENTION

A composition as indicated in the preceding summary is preferably proportioned so that certain physical properties or characteristics such as the production of a clear, distinct, relatively permanent image results from the use of the composition. Although all of the ingredients in the composition are considered to cooperate or interact with one another in producing such a desired clear, distinct and relatively permanent ink image, the various individual ingredients within the ink composition tend, to a significant degree, to effect certain secondary characteristics or properties which are important in influencing the results obtained through the use of the composition.

As an example of this, the "vinyl" polymer placed in solution in the composition of this invention is considered to be important in both providing a protective film upon an ink area and in securing adhesion of an ink area or impression to a so-called "vinyl" surface. As used herein, the term "vinyl" has a meaning as indicated in the preceding Background of the Invention. In order to provide the desired adhesion, the "vinyl" polymer in the fixing composition should be of the same character as the "vinyl" surface. It has been found that all of the various different polymers and copolymers defined in the preceding as "vinyl" polymers are sufficiently compatible with one another so that a satisfactory degree of adhesion can be obtained between such a "vinyl" polymer composition and such a "vinyl" surface. A mixture of said "vinyl" polymers can be employed in a composition of this invention.

In formulating a composition of this invention, sufficient of the "vinyl" polymer material should be used in the composition so that the composition, upon drying upon a "vinyl" surface, will adhere to such a surface to such an extent that it cannot be removed easily by physical abrasion. On the other hand, the quantity of such "vinyl" polymer material must be limited since if an undesirable excess of this polymer material is placed in the solution the use of the composition will tend to yield an undesirable, rough, "sandy" type of surface appearance. Also, if an excess of the "vinyl" polymer material is used, the composition may tend to form fiber-like strings as it is being applied during use. In general, from about 2 to about 10% by weight of the entire composition should be what is referred to herein as a "vinyl" polymer if these two types of problems are to be avoided.

The acrylic polymers which can be used in a composition of this invention are of a type commonly referred to as acrylate and methacrylate polymers. Probably the most important of these is poly(methyl methacrylate). These polymers are capable of drying from the solvent solution so as to form a film and hence may be referred to as filmforming polymers. Mixtures of these polymers may, of course, be employed. It will be recognized that from a strict technical sense such acrylic polymers are vinyl polymers. They are not to be confused with "vinyl" polymers as the expression is used in this specification, since in this specification the term "vinyl" is used in a commonplace or trade sense.

The acrylic polymer used in a composition of this invention is important in providing from the use of the composition a relatively abrasion-resistant type of characteristic. Also, the acrylic polymer used is considered desirable in providing, upon use of the composition, a relatively smooth, clear surface appearance. The acrylic polymer used is also considered to aid in achieving surface adherence upon drying of the final composition to a so-called "vinyl" surface.

If too little of the acrylic polymer is used in a composition of this invention, upon use of the composition the desired abrasion-resistance is not achieved, and there is a distinct tendency for the product resulting from such use to not have a desired surface appearance. If the quantity of the acrylic polymer is too great, the composition will tend to form fibers as it is being used. Also, the surface resulting from the use of such a composition may tend to be brittle. It is considered that such undesirable results can be avoided by using from about 0.5 to about 5% by weight of the acrylic polymer in the entire composition.

When flexibility is desired in the product resulting from the use of the composition of this invention, as, for example, when this composition is to be used upon a flexible "vinyl" sheet, it is considered necessary to incorporate within the composition a conventional plasticizer for "vinyl" polymers as the term is used herein, since without such plasticizers these polymers tend to be relatively inflexible, and if a plasticizer were not used a printed article resulting from the use of the composition of the present invention would tend to have a relatively brittle surface which would tend to crack upon flexing. A number of such plasticizers are well known. No point is seen in reproducing in this specification a list of such well known plasticizers inasmuch as they are given in appropriate technical literature. Reference is made to the list of such plasticizers appearing in the text "Vinyl and Related Polymers," by Schildknecht, copyright 1952, John Wiley & Sons, New York.

The amount of such plasticizer can be varied to the same extent as is conventional in the industry in varying the amount of plasticizer to make a "vinyl" article of a given degree of flexibility. It is considered that adequate flexibility in a product resulting from the use of the composition of this invention can be achieved with an amount of plasticizer of from about 20 to about 50% by weight of the weight of the vinyl polymer used. Thus, the weight of the plasticizer can vary in a composition of this invention from a low of 0.4% of the weight of the composition to a maximum of 5% of the weight of the entire composition, depending upon the amount of the vinyl polymer employed. The plasticizer used, of course, must be soluble in the solvent or solvent system employed in the composition.

As indicated in the preceding summary, tetrahydrofuran should either be used as the sole solvent in a composition of this invention or should be used as the basic solvent with other secondary solvents. Such secondary solvents may be relatively volatile solvents such as methyl ethyl ketone, acetone, diethyl ketone, or the like, which are compatible with tetrahydrofuran and which vaporize under normal ambient conditions at nearly the same rate as tetrahydrofuran. Solvents of this latter category may be employed in the composition of this invention in order to extend the tetrahydrofuran because of the comparatively high cost of this latter material. Secondary, relatively slow-drying solvents such as toluene (toluol) or cyclohexane may also be blended with the tetrahydrofuran in a composition of this invention in an amount up to about one-half of the weight of the total solvent in order to control the properties of the product resulting from the use of a composition of this invention.

The amount to which the tetrahydrofuran can be extended using a relatively volatile solvent such as methyl ethyl ketone, without affecting the properties of the tetrahydrofuran, will vary slightly, depending upon the type of the secondary solvent used for extending purposes. In general, it is considered that up to about 15% by weight of the weight of the total composition of this invention can be a relatively volatile solvent. The balance of the weight of the complete composition after all of the other ingredients are taken into consideration should, of course, be the tetrahydrofuran.

When a composition of this invention using only tetrahydrofuran or tetrahydrofuran extended with a minor amount of a comparatively volatile solvent such as methyl ethyl ketone is used in an atmosphere containing a significant amount of moisture, as a result of the use of the composition there is a tendency for an ink area or impression on the final product to have a slightly "cloudy" or "snowy" type of background surface appearance. The nature of this appearance is difficult to express in words, but is considered objectionable. Such a surface appearance is not obtained if a composition of this invention using tetrahydrofuran or this solvent extended with a minor amount of a volatile solvent such as methyl ethyl ketone is used in a relatively dry ambient atmosphere. As used herein, the term "relatively dry" means an atmosphere such as is normally encountered on a sunny day. It is considered that normally such an atmosphere contains approximately 30% or less relative humidity.

When the composition is to be used in atmospheres containing significant amounts of moisture, such as atmospheres containing over about 30% relative humidity, up to a maximum of about one-half of the weight of the total solvent employed may be what is referred to herein as a relatively slow-drying solvent. In general, the higher the humidity at which the composition is to be used, the more such a relatively slow-drying solvent should be used so that the maximum figure of 50% of the total solvent should be a slow-drying solvent when the composition is to be used under conditions at or approaching 100% relative humidity. The use of such a relatively slow-drying solvent when the composition is to be used where there is significant atmospheric moisture, for unknown reasons, tends to prevent the cloudy type of surface appearance obtained when tetrahydrofuran alone is used as the solvent or is used in connection with a minor amount of a comparatively volatile solvent such as methyl ethyl ketone.

It will be recognized from the preceding that a variety of different compositions falling within the scope of this invention can be formulated. The following examples of various compositions are given in order to facilitate the understanding of this invention. They are not to be considered as limiting the scope of this invention in any respect. All amounts listed in these examples are parts by weight.

EXAMPLE 1

| | |
|---|---|
| Vinyl resin—EP103, produced by B. F. Goodrich Chemical Co., Cleveland, Ohio | 12.5 |
| Acrylic resin—Lucite 2010, produced by E. I. du Pont de Nemours & Co., Wilmington, Del. | 3.5 |
| Dioctylphthalate (plasticizer) | 4.0 |
| Tetrahydrofuran | 370.0 |
| Methyl ethyl ketone | 10.0 |

EXAMPLE 2

| | |
|---|---|
| Vinyl resin—as in Example 1 | 12.5 |
| Acrylic resin—as in Example 1 | 3.5 |
| Dioctylphthalate | 4.25 |
| Tetrahydrofuran | 190.0 |
| Cyclohexane (Note: toluene can be substituted) | 190.0 |

The use of a composition of this invention is relatively simple in one manner of use. In printing upon a "vinyl" surface, first an area or impression of ink of a desired color of a "vinyl" ink is located upon the surface. Then, within a relatively short period, before there has been an opportunity for either the ink or the polymer material in the surface to diffuse into the other, a composition of this invention is applied to the surface and the ink to a sufficient extent so as to thoroughly cover both. Then the composition and the ink are both dried together as rapidly as is conveniently possible.

The thickness of the coating applied is difficult to express in precise terms. In general, the composition should be applied in a film which is just barely continuous so as to adequately cover the ink area or impression and should be no thicker than this in order to avoid using excess material. The application of this film of the composition is preferably by spraying so as to coat the surface with such a continuous layer. The use of spraying as a method of application effectively eliminates any chance of smearing of the wet ink upon the "vinyl" surface.

In the preferred use of the composition of this invention, after the composition is applied as described, both the ink and the composition are dried together as previously indicated. Because of the volatility of the tetrahydrofuran, normally such drying is virtually instantaneous when a printed and coated surface is exposed to normal atmospheric conditions. This type of drying in a very short time interval may be referred to a flash drying. When necessary because of low temperatures, high humidity or the like, other known drying methods, such as radiation, hot air or the like, may be employed.

After the ink area or impression is located on the surface, coated and dried as indicated in the preceding, further other ink areas may be located upon the printed and treated surface thus obtained. Various successive areas may be built up in this manner in obtaining multicolored images. This manner of use is considered advantageous in "fixing" the individual different ink areas or impressions of different colors so that these areas or impressions of different inks do not interfere with one another.

The compositions of this invention may also be used by being applied in a film, as disclosed in the preceding, directly to previously dried ink impressions or areas. Such impressions or areas can be of a single color or can be a series of impressions of different colors. When used in this manner, the coated surface should, of course, be dried as previously indicated. The use of a single coating of a composition of this invention on previously dried impressions or areas may be advantageous for certain applications inasmuch as such use does not have to be accommodated to existing printing facilities and operations.

A preferred method of use is indicated in the accompanying drawing in connection with the printing of a multicolored image such as a half-tone image of a photograph. In practicing the method with such an image, first a yellow conventional vinyl ink is printed upon a "vinyl" surface and then, immediately after the application of the ink, within a matter of several seconds, a continuous film of the composition of this invention is sprayed on the printed surface. The ink and the composition are then flash-dried.

Following this, blue ink areas or impressions of conventional vinyl ink are placed upon the so-called dried surface and in the same time interval are covered with a sprayed film of a composition of this invention. This ink and the composition are then again dried in the same manner. Following this, a red ink of a conventional vinyl type is located upon the surface in the same manner and before it has had a chance to dry or diffuse to any significant extent a sprayed coating of a composition of this invention is placed upon it. The ink and the composition are then flash-dried. In a similar manner, a black ink is then located on the surface, covered with a composition of this invention, and then flash-dried.

From a consideration of this specification, those skilled in the art of printing upon vinyl materials by different methods such as silk screen, letterpress, lithography and the like will realize that the compositions of this invention can be used in a number of different ways so as to accomplish the broad objectives of this invention. They will also realize that when these compositions are used in the intended manner they make it possible to provide clear, distinct, permanent printing upon vinyl surfaces without difficulty. The effectiveness of this invention is considered to be shown by the fact that by following the disclosure set forth in this specification, it is possible to create comparatively fine line multicolored, half-tone reproductions by lithographic and other processes.

What is claimed is:

1. A process for fixing an ink upon a vinyl polymer surface in which the polymer is selected from the group consisting of vinyl chloride polymers, copolymers of vinyl chloride and vinyl acetate, and copolymers of vinyl chloride and vinylidene chloride, which comprises the steps of:
  applying an ink to said surface;
  immediately covering said ink and said surface with a composition consisting essentially of a solvent solution of from 0.5 to 5% by weight of a film forming acrylic polymer and at least one vinyl polymer selected from the group consisting of vinyl chloride polymers, copolymers of vinyl chloride and vinyl acetate, and copolymers of vinyl chloride and vinylidene chloride, and tetrahydrofuran serving as a solvent for said polymers; and
  drying said composition and said ink as rapidly as possible.

2. A process as claimed in claim 1 including the steps of:
  further applying an ink to the material on said surfaces;
  immediately covering the further applied ink with said composition; and
  drying said further applied composition and said further applied ink as rapidly as possible.

3. A process as claimed in claim 2 wherein said composition includes a plasticizer for said vinyl polymer, and at least one solvent which is slower drying than said tetrahydrofuran.

4. A process as claimed in claim 1 wherein:
  said composition includes a plasticizer for the vinyl polymer in said solvent solution and at least one other solvent which is slower drying than said tetrahydrofuran;
  said composition contains from 2 to 10% by weight of said vinyl polymer, from 20 to 50% by weight of the weight of said vinyl polymer of said plasticizer, and the remainder solvent; and
  from 0 to 50% by weight of the total weight of the solvent is said solvent which is slower drying than said tetrahydrofuran.

5. A process as claimed in claim 4 wherein said other solvent is selected from the group consisting of toluene and cyclohexane.

References Cited

UNITED STATES PATENTS

| | | | |
|---|---|---|---|
| 2,453,052 | 11/1948 | Van Etten | 117—15 |
| 2,989,414 | 6/1961 | Pecker | 117—76(F2)X |

WILLIAM D. MARTIN, Primary Examiner

R. HUSACK, Assistant Examiner

U.S. Cl. X.R.

117—15, 45, 72; 260—304